United States Patent Office 3,312,701
Patented Apr. 4, 1967

3,312,701
3-CHLOROPHYRIDAZONE-(6)-1-ACETIC ACID DIALLYLAMIDE
Heimo Stormann-Menninger-Lerchenthal, Linz (Danube), Engelbert Kloimstein, Eferding, and Rupert Schönbeck, Leonding, near Linz (Danube), Austria, assignors to Osterreichische Stickstoffwerke Aktiengesellschaft, Linz (Danube), Austria
No Drawing. Filed July 18, 1966, Ser. No. 565,721
Claims priority, application Austria, July 30, 1965,
A 7,047/65
1 Claim. (Cl. 260—250)

This invention relates to a pyridazone derivative and to a process for the preparation thereof.

It is known that dialkylamides of 3-chloropyridazone-(6)-1-acetic acid have sedative properties and are especially suitable for use in pediatrics. These dialkylamides may be produced by reacting 3-chloropyridazone-(6) with haloacetic acid dialkylamides in the presence of acid-binding agents.

The present invention provides the compound 3-chloropyridazone-(6)-1-acetic acid diallylamide and it has been discovered that this novel compound has outstanding sedative properties which are considerably more pronounced than for the compounds hitherto known. At the same time the toxicity for warm-blooded animals is very low.

The dosage of this compound which produces a clear reduction in locomotoric activity of mice is about 100 mg./kg., whereas the $LD_{50}$ for mice is 2.25 g./kg. after oral administration. This indicates a very favourable relationship between the effective and the toxic dosage. Clinical experiments in which the compound was administered at dosages of 250 and 500 mg. in the form of tablets also confirmed the good sedative effect of the compound, and no side-effects have been observed. The compound can therefore be used as a sedative and mild sleeping drug. The present invention accordingly provides a therapeutic composition comprising, as the active agent, 3-chloropyridazone-(6)-1-acetic acid diallylamide in admixture with a physiologically acceptable carrier therefor.

3-chloropyridazone-(6)-1-acetic acid diallylamide may be prepared by reacting 3-chloropyridazone-(6) with a haloacetic acid diallylamide in the presence of an acid-binding agent. The conversion takes place particularly favourably in a solvent such as water or an aqueous alkanol, e.g. ethanol, using an alkali metal hydroxide as the acid-binding agent for eliminating the hydrogen halide, with the amount of the agent being so chosen as to provide a pH value of about 8. The reaction is suitably carried out at an elevated temperature of about 70° to 110° C. After cooling, the desired amide separates out in the form of crystals.

The following example illustrates the process of the invention.

EXAMPLE 130.5 g. of 3-chloropyridazone-(6) (1 mole) are dissolved in 500 ml. of 2 N aqueous sodium hydroxide, treated with 171.5 g. of chloracetic acid diallylamide (1 mole) and the mixture is boiled under reflux. After cooling to ambient temperature the crystals which have separated out are removed and recrystallised once from ethanol. In this way 224 g. of pure 3-chloropyridazone-(6)-1-acetic acid diallylamide are obtained, representing 84% of theory.

The melting point of the product is about 139° C.

We claim:
3-chloropyridazone-(6)-1-acetic acid diallylamide.

No references cited.

NICHOLAS S. RIZZO, *Primary Examiner.*